Figure 3:
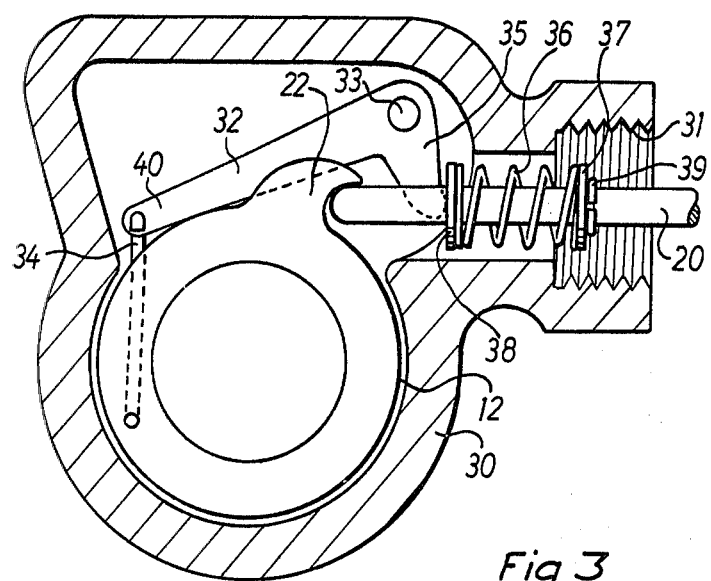

United States Patent [19]

Quiney

[11] 4,295,548

[45] Oct. 20, 1981

[54] BRAKE ACTUATOR

[75] Inventor: Kenneth M. Quiney, Kings Heath, England

[73] Assignee: Girling Limited, Birmingham, England

[21] Appl. No.: 98,595

[22] Filed: Nov. 29, 1979

[30] Foreign Application Priority Data

Dec. 9, 1978 [GB] United Kingdom ............... 47852/78

[51] Int. Cl.³ ............................................. F16D 65/18
[52] U.S. Cl. ..................................... 188/72.7; 188/348
[58] Field of Search ................. 188/72.1, 72.7, 106 R, 188/343, 348

[56] References Cited

U.S. PATENT DOCUMENTS 3,144,100  8/1964  Kay ............................ 188/106 R X
3,269,491  8/1966  Belart et al. .................... 188/72.7 X

FOREIGN PATENT DOCUMENTS 315913  7/1929  United Kingdom ............... 188/72.7

Primary Examiner—Duane A. Reger
Attorney, Agent, or Firm—Scrivener, Clarke, Scrivener and Johnson

[57] ABSTRACT

A helical thrust bearing (14) is arranged between two rotatable cam components (12 and 13) of a brake actuator. The cam component (13) is turned first while the brake slack is being taken up and the brake-applying force is relatively low, the reaction to such force being transmitted to the body (10) at a plain axial thrust bearing (17,18). Only the cam component (12) is turned when the brake is actually being applied with the relatively high brake force which is transmitted to a thrust member (15) at a roller axial thrust bearing (16). This enables the pneumatic force motor or the prime mover to be used more efficiently. Also a greater angular displacement at the helical thrust bearing (14) is obtained for a given angular displacement of the cam components (12 and 13) relative to the body (10).

In a modification, the plain thrust bearing (17,18) is replaced by another helical thrust bearing.

12 Claims, 7 Drawing Figures

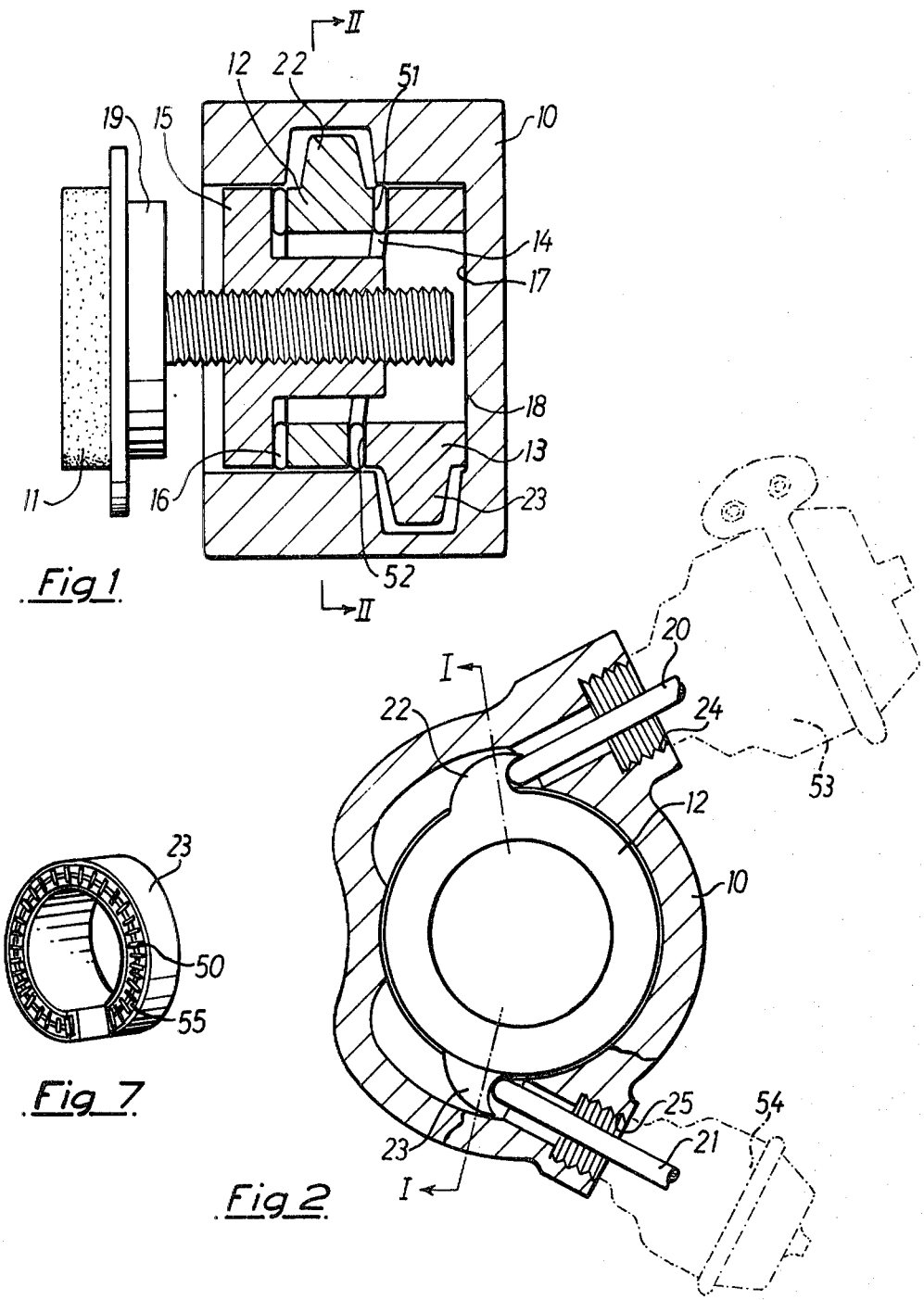

BRAKE ACTUATOR

DESCRIPTION

The present invention relates to brake actuators and more particularly to mechanical actuators for vehicle brakes such as disc brakes.

When brake pads are applied to a disc of a disc brake, the distance travelled by the pads is very small and the actuating or clamping force is high. The actual energy needed to apply a pad to the brake is the product of the pad travel and the applied force. In the case of hydraulic actuators in which a hydraulic cylinder is directly aligned with the brake pads, the small travel and high clamping force are readily attained. However in the case of a mechanical actuator the prime mover is usually either a hand brake lever operating through brake cables or an air cylinder. Both hand brake cables and air cylinders can in practice only function with a relatively long travel and a relatively low force. Whilst the product of travel and force may provide the required actuation energy at the prime mover, it is necessary to incorporate a "lever ratio" between the prime mover and the pads. At lever ratios up to about 4:1 it is relatively easy to ensure that the energy available and the pad is reasonably close to the energy applied by the prime mover. However, if higher lever ratios are required, for example 15:1 and above, conventional "lever arrangements", i.e. devices providing a mechanical advantage, such as ball and ramp mechanisms and cam and strut mechanisms have been found to be very inefficient so that the energy made available at the prime mover needs to be much greater than that required at the brake pad.

This problem of inefficiency at high lever ratios has been largely overcome by the mechanical actuator described in British patent specifications Nos. 1,492,391 and 1,492,392. This mechanical actuator comprises a helical thrust bearing between rotatable and non-rotatable cam components. The helical thrust bearing comprises rolling members, such as bearing rollers or needles, disposed between axially confronting helical cam tracks on the rotatable and non-rotatable cam components. Furthermore, an axial thrust bearing also comprising bearing rollers is advantageously provided at that side of the rotatable cam component remote from the helical thrust bearing.

It has now been found that the use of a helical thrust bearing in a mechanical brake actuator has reduced the friction so far and thereby increased the efficiency of high mechanical advantage mechanisms that problems have arisen in using the helical thrust bearing to its full potential. The problem arises in this way, that is to say, there is a practical limitation to the angle through which the rotatable cam component can be turned because the rotatable cam component has a radially projecting lever which is engaged by a push rod or a flexible cable which thereby acts substantially tangentially on the rotatable cam component. This is because the line of action of the push rod or brake cable must remain approximately at right angles to the projecting lever i.e. the angle between the rod or cable and the projecting lever must remain within a range of say 75° to 105°. However, the rotatable cam member is itself capable of being turned through an angle of more than 30° without exceeding the load carrying capacity of the rolling members between the confronting cam tracks. Thus the helical thrust bearing is not used to its full ability because there has needed to be a compromise between the straight line travel produced by the prime mover and the arcuate travel of the rotatable cam component thereby effected.

It is an object of the present invention to provide a mechanical actuator in which a helical thrust bearing can be used to greater effect.

A brake actuator according to the present invention comprises a body, first and second cam components rotatable in said body and in axial co-operative relationship with one another via respective helical cam tracks, the cam tracks being complementary to one another and axially confronting one another to form a helical thrust bearing, an output member axially displaceable relative to the body, a first thrust bearing axially operative between the first cam component and the output member, a second thrust bearing axially operative between the second cam component and the body and means for rotating both of said cam components relative to said body, the arrangement being such that one of the cam components is turned relative to the body to yield a relatively low output force at the output member and the other of the cam components is turned relative to the body, with said one cam component not rotating, to yield a relatively high output force at the output member.

Preferably the helical thrust bearing includes a plurality of rolling members between said confronting helical cam tracks, the rolling members being located in a cage.

It is advantageous for the thrust bearing with which said other cam component is axially operative to comprise a roller thrust bearing.

Nevertheless, in some embodiments of the invention, it is preferred that the thrust bearing with which said one cam component is axially operative should comprise a plain axial thrust bearing.

Generally the two cam components will be rotatable in opposite directions relative to the body, such that the one cam component is turned in one direction to yield the low output force and the other cam component is turned in the other direction to yield the high output force.

In some embodiments, said rotating means is operative between said body and said one cam component to turn such one component in said one direction and between said body and said other cam component to turn such other component in said other direction.

In other embodiments, said rotating means is operative between the two cam components and in that case the thrust bearing with which said one cam component is axially operative also preferably comprises a helical thrust bearing.

Figure 6:
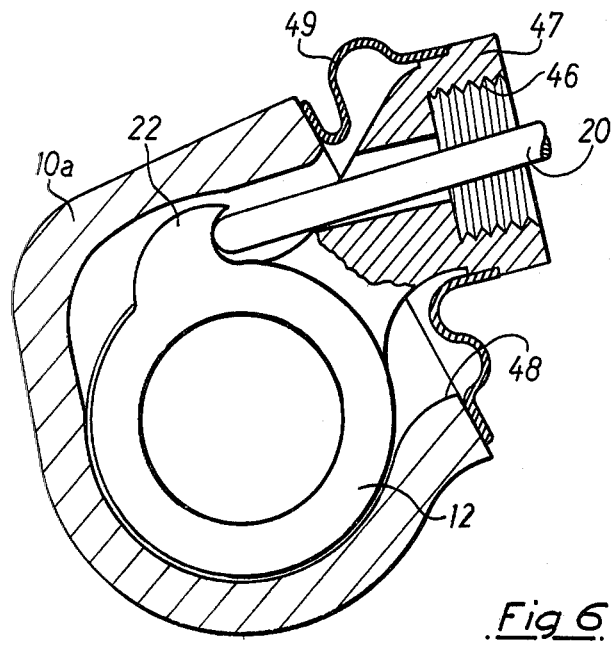
Figure 4:
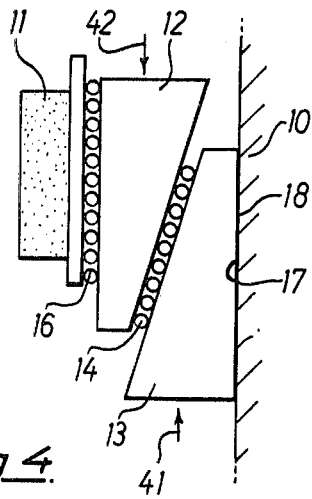
Figure 5:
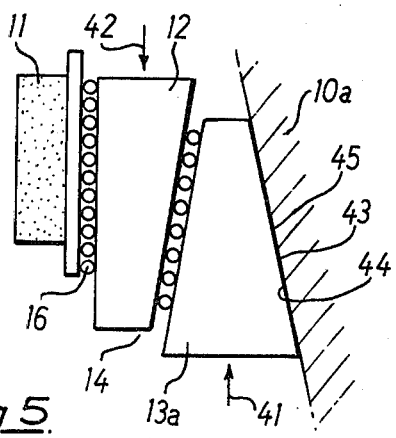

The invention is further described, by way of example, with reference to the accompanying drawings, in which:

FIG. 1 is a somewhat diagrammatic sectional view of the salient parts of a mechanical brake actuator in accordance with one embodiment of the invention, FIG. 2 is a cross sectional view of the mechanical actuator of FIG. 1, FIG. 3 is a similar cross sectional view but showing a slightly different embodiment, FIG. 4 is a diagrammatic developed view of the cam components of the actuator of FIGS. 1 and 2, FIG. 5 is a similar developed view but representing a further embodiment of mechanical actuator, and FIG. 6 is a cross sectional view of the embodiment of mechanical actuator diagrammatically depicted in FIG. 5, and FIG. 7 is a perspective view of the caged rollers of a helical thrust bearing suitable for the actuator of FIGS. 1 and 2.

Referring first to FIGS. 1 and 2, a mechanical brake actuator for a disc brake comprises a body 10 which will generally form part of or act upon a sliding caliper (not shown). The sliding caliper acts upon an indirectly operated brake pad assembly (also not shown) which is opposed to a directly operated brake pad assembly 11. The disc (also not shown) will normally extend between the brake pad assemblies as in any spot type reaction disc brake. The mechanical actuator comprises counter-rotatable cam components 12 and 13, both of which are rotatable in the body member 10. A helical thrust bearing 14 is provided between the cam components 12 and 13 and comprises bearing needles or rollers 50 (FIG. 7) disposed between axially confronting helical cam tracks 51 and 52 on the components 12 and 13 and located by a cage 55 (FIG. 7), as more fully described in British patent specification Nos. 1,492,391 and 1,492,392. The cam component 12 acts against a thrust member 15 via a conventional bearing 16 comprising bearing needles or rollers. The cam component 13 on the other hand abuts by its rear surface 18 against the base surface 17 of the body member 10 to form a conventional plain axial thrust bearing. A tappet member 19 is screw-threaded into the thrust member 15 to provide for brake adjustment and acts against the directly operated brake pad assembly 11.

Looking at FIG. 2 it will be seen that counterclockwise rotation of the cam component 12 by means of a push rod 20 will apply the brake as will clockwise rotation of the cam component 13 (concealed in FIG. 2) by means of a push rod 21, the push rods 20 and 21 acting on lugs 22 and 23 provided respectively on the cam components 12 and 13. It is contemplated that a large air motor 53 of conventional type will act on the push rod 20 and a screw threaded socket 24 is provided in the body member 10 for the attachment of such air motor. A relatively small air motor 54 is needed for the push rod 21 and the body member 10 is provided with a screw-threaded socket 25 to receive the small air motor.

The brake application by means of the mechanical actuator illustrated takes place in two separate distinct stages. The first stage is the take-up of the brake slack for which purpose a large travel with a small force is needed and this first stage is effected by means of the small air motor 54 acting on the cam component 13. The actuator is so designed that the correctly adjusted brake slack corresponds to the travel achieved by means of the clockwise rotation of the cam component 13 by means of the small air motor. The second stage of brake operation is the brake application proper in which the brake disc is clamped between the directly and indirectly operated brake pad assemblies. This second stage is achieved by means of the large air motor 53 acting on the cam component 12 which turns in an anti-clockwise direction. The provision of the roller thrust bearing 16 and the helical thrust bearing 14 as described in the above mentioned British patents ensures that there is little frictional resistance to rotation of the cam component 12 whereby the large air motor is used with high efficiency to apply the brake.

Thus, it will be seen that a mechanical actuator employing a helical thrust bearing has been provided in which a relative angular displacement between the two cam components of say 60° is obtained but each cam component is only rotated through say 30° by its respective air motor. Thus the helical thrust bearing is employed to greater potential than would be the case if only a relative annular displacement of say 30° between the two cam components were usable. Each of the air motors 53, 54 is used to high efficiency. The work lost through friction between the surfaces 17 and 18 when the cam component 13 is rotated by the small air motor 54 is not very significant since at that time the brake thrust is low and therefore the friction forces are low. The provision of a plain thrust bearing between the cam component 13 and the body member 10 offering somewhat more frictional resistance to rotation than a roller thrust bearing ensures that the cam component 13 does not rotate in the reverse direction when the clamping force is applied by rotation of the cam component 12.

It will be appreciated that some valving arrangement is needed to ensure that the small air motor 54 has effected its full travel before the large air motor has been actuated to any significant extent. One way in which such valving may be operated is to use a pressure sensitive valve which is responsive to the pressure in the small air motor. When this pressure reaches a predetermined value the pressure sensitive valve operates to apply the compressed air to the large air motor 53. Such a valve is often called a "sequence valve" and is of conventional construction well known in the art and therefore not illustrated. Alternatively a conventional mechanically operated limit valve may be so positioned as to be operated by the small air motor when the small air motor 54 has executed a predetermined travel.

FIG. 3 illustrates a modification in which it is possible to dispense with the small air motor. Thus, in the embodiment of FIG. 3, a single air motor (not shown but like the air motor 53 of FIG. 2) acts via the push rod 20 on the lug 22 of the cam component 12, the body member 30 being provided with a screw threaded socket 31 to receive this single air motor. The other cam component which is concealed in FIG. 3 and which corresponds to the cam component 13 of FIG. 1 is operated in the opposite direction by means of a bell crank lever 32 pivotable about a fixed pivot 33 in the body member 30 and a connecting rod 34. The push rod 20 acts on a short lever arm 35 of the bell crank lever 32 via a spring 36 which is confined between spring abutment washers 37 and 38. The washer 37 rests against a spring ring 39 received in a peripheral groove in the push rod 20 and the washer 38 acts against the free end of the short lever arm 35, this free end being suitably forked so that the push rod 20 passes between the prongs of the fork. The connecting rod 34 is arranged between a long lever arm 40 of the bellcrank lever 32 and a point on the concealed cam component suitably spaced from its rotary axis.

In the illustrated embodiment, the bellcrank lever 32 offers an approximately 3:1 step-up ratio so that, for the first part of the travel of the air motor, both cam components are rotated but in opposite directions and the concealed cam component rotates three times as far as the cam component 12. It is to be observed that the spring 36 must be strong enough not to yield under the relatively low force necessary to turn the concealed cam component when taking up brake slack. When the concealed cam component has completed its permissible angular displacement or when the point has been reached when the brake-applying force has increased significantly, the air motor continues to act on the push rod 20 but the spring 36 now yields so that the major part of the angular travel path of the cam component 12 can be completed, applying the necessary clamping force to the brake pad assemblies.

Although the force of the spring 36 is significant in that it transmits the motor force necessary to take up brake slack, the spring 36 is nevertheless weak compared with the motor force necessary to apply the brake-clamping force. Also, the further compression of the spring 36 which takes place when the brake-clamping force is being applied is not large as the brake travel at this stage of brake application is small. Therefore, although the compression of the spring 36 during the second stage of brake operation does represent a loss of work at the brake pad assemblies, this loss is not significant in relation to the total work done in applying the brake.

In both of the above described embodiments, one cam component rotates in one direction to take up the brake slack during the first stage and the other cam component rotates in the opposite direction at least during the second stage for applying the brake clamping force. The angle through which the second cam component rotates during this second stage need not be as great as the angle through which the first cam component rotates, depending on design requirements. The operation of the embodiments of FIGS. 1 to 3 is represented diagrammatically in FIG. 4 which is a developed view of the two cam components. For simplicity the component 12 is shown as acting immediately against the brake pad assembly 11 without the interposition of the thrust member 15 and tappet 19. In FIG. 4 the small air motor 54 or the lever 32 applies a force against the cam component 13 as indicated by the arrow 41 and the large air motor 53 or rather the push rod 20 applies a force in the opposite direction to the cam component 12 as indicated by the arrow 42.

As can be seen in FIG. 4 as well as in FIG. 1, the cam component 13 engages the base of the body member 10 at a plain thrust bearing formed by the interengaging surfaces 17 and 18 which are planar and perpendicular to the rotary axis. In the alternative arrangement shown in FIG. 5, instead of a plain thrust bearing, a helical thrust bearing 43 is provided between the cam component 13a and the body member 10a. This helical thrust bearing is formed by axially confronting and mutually abutting helical surfaces 44 and 45 provided respectively on the base of the body member 10a and the rear face of the cam component 13a. Thus, unlike the helical thrust bearing 14 which is as in the previous embodiments, the helical thrust bearing 45 does not possess any friction reducing rollers or other rolling members. The cam component 12 acts through the roller thrust bearing 16 on the directly operated brake pad assembly 11. Thus for a given angle of rotation of the cam component 13a a greater axial travel of the brake pad assembly 11 is achieved than for the same angular displacement, but in the opposite direction, of the cam component 12.

The cam components 12 and 13a of FIG. 5 can be operated by separate large and small air motors as in the embodiment of FIGS. 1 and 2 or the cam component 12 can be operated directly by an air motor and the cam component 13a indirectly from the same air motor but via a lever as in the arrangement of FIG. 3. Thus the two stages of operation are rendered even more disparate, whereby a motor having a still smaller total energy potential may be utilised to provide the desired actuation energy at the brake pads.

Another way of employing the principal shown in FIG. 5 is by the use of a single air motor in the arrangement illustrated in FIG. 6. In FIG. 6 the air motor (not illustrated but like the air motor 53 in FIG. 2) is secured to a screw-threaded socket 46 in a boss 47 which is integral with the cam component 13a which is concealed in FIG. 6 behind the cam component 12. The push rod 20 actuated by the air motor acts against the lug 22 on the cam component 12. Thus, instead of being fixed to the body member 10a, the air motor swings with pivotal movement of the cam component 13a. The boss 47 extends through an opening 48 in the body member 10a, the opening being sealed by means of a flexible rubber boot 49.

Means are provided such that, during the first stage of brake operation, the cam component 12 is prevented from turning. During this first stage, the operation of the air motor causes the cam component 13a to move in a counter-clockwise direction, as represented by the arrow 41 in FIG. 5, the brake pad assembly travel thereby achieved being of a relatively large magnitude for a given motor travel. Means are provided such that, when the first stage is completed, which is represented either by the brake applying force becoming significantly larger or by the cam component 13a having completed its allotted angular travel, the air motor commences to rotate the cam component 12 anti-clockwise as represented by the arrow 42 in FIG. 5. The relatively high friction developed between the surfaces 43 and 44 prevents the cam component 13a from being rotated in the wrong direction as the brake clamping force is applied by virtue of the operation of the cam component 12.

Because, in the embodiment of FIG. 6, the air motor is operative between the two relatively rotatable cam components, the advantage of the preceding embodiments that a greater relative angular displacement between the two cam components for a given motor travel may be obtained, is lost. The embodiment of FIG. 6 nevertheless does have the other advantage that the air motor is used more efficiently during the first stage in which a relatively long brake travel is required to take up brake slack when the motor force need only be relatively small when taking up the brake slack.

Further alternatives within the scope of the invention are envisaged. For example, the air motor casing could be attached to the cam component 12 in which case the push rod 20 would act on the cam component 13a. A further more radical change would be to make the helical thrust bearing 14 and 45 of FIG. 5 of the same hand but different pitches, rather than of opposite hands as illustrated. In that case both cam components would rotate in the same direction.

I claim:

1. A brake actuator comprising a body; first and second cam components rotatable in said body and having thereon respective helical cam tracks via which said cam components are in axial co-operative relationship with one another, said cam tracks being complementary to one another and axially confronting one another to form a helical thrust bearing; an output member axially displaceable relative to said body; a first thrust bearing axially operative between said first cam component and said output member; a second thrust bearing axially operative between the second cam component and said body; and means for rotating both of said cam components relative to said body, the operative relationship between said cam components, said thrust member and said body being such that turning of one of said cam components relative to said body by said rotating means yields a relatively low output force at said output member and turning of the other of said cam components relative to said body, with said one cam component not rotating, yields a relatively high output force at said output member.

2. A brake actuator according to claim 1, in which said helical thrust bearing includes a plurality of rolling members between said confronting helical cam tracks.

3. A brake actuator according to claim 2, in which said helical thrust bearing includes a cage in which said rolling members are located.

4. A brake actuator according to claim 1, in which said thrust bearing with which said other cam component is axially operative comprises a roller axial thrust bearing.

5. A brake actuator according to claim 1, in which said thrust bearing with which said one cam component is axially operative comprises a plain axial thrust bearing.

6. A brake actuator according to claim 1, in which said thrust bearing with which said one cam component is axially operative also comprises a helical thrust bearing.

7. A brake actuator according to claim 1, in which said two cam components are rotatable in opposite directions relative to said body, said one cam component being rotatable in one direction to yield said low output force and said other cam component being rotatable in a direction opposite to said one direction to yield said high output force.

8. A brake actuator according to claim 6 in which said two cam components are rotatable in the same direction relative to said body, said one cam component being rotatable in one direction to yield said low output force and said other cam component being rotatable in a direction opposite to said one direction to yield said high output force.

9. A brake actuator according to claim 1, in which said rotating means is operative between said body and said one cam component to turn said one cam component and between said body and said other cam component to turn said other component.

10. A brake actuator according to claim 9, in which said rotating means comprises a first motor operative upon said one cam component and a second motor operative upon said other cam component.

11. A brake actuator according to claim 9, in which said rotating means comprises a single motor operative directly on said other cam component and a spring and a lever via which said single motor acts on said one component.

12. A brake actuator according to claim 7, in which said rotating means is operative between said cam components.

* * * * *